(12) United States Patent
Park et al.

(10) Patent No.: US 8,059,273 B2
(45) Date of Patent: Nov. 15, 2011

(54) MICRO SPECTROMETER FOR PARALLEL LIGHT AND METHOD OF USE

(75) Inventors: Yeonjoon Park, Yorktown, VA (US); Sang H. Choi, Poquoson, VA (US); Glen C. King, Williamsburg, VA (US); James R. Elliott, Vesuvius, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 48 days.

(21) Appl. No.: 12/496,788

(22) Filed: Jul. 2, 2009

(65) Prior Publication Data
US 2010/0039643 A1 Feb. 18, 2010

Related U.S. Application Data

(60) Provisional application No. 61/089,194, filed on Aug. 15, 2008.

(51) Int. Cl.
*G01J 3/28* (2006.01)
(52) U.S. Cl. ...................................................... 356/328
(58) Field of Classification Search .................. 356/328
See application file for complete search history.

(56) References Cited

U.S. PATENT DOCUMENTS

| | | | |
|---|---|---|---|
| 3,107,270 A | 10/1963 | Hildebrand | |
| 4,733,943 A * | 3/1988 | Suzuki et al. | 359/565 |
| 4,752,130 A | 6/1988 | George et al. | |
| 5,731,874 A | 3/1998 | Maluf | |
| 5,911,018 A | 6/1999 | Bischel et al. | |
| 5,986,758 A | 11/1999 | Lyons et al. | |
| 6,226,083 B1 | 5/2001 | Schwerzel et al. | |
| 6,335,625 B1 | 1/2002 | Bryant et al. | |
| 6,452,675 B1 | 9/2002 | Muller et al. | |
| 6,518,555 B1 | 2/2003 | Kikuchi et al. | |
| 6,762,839 B2 | 7/2004 | Zeylikovich et al. | |
| 6,965,464 B2 * | 11/2005 | Mossberg | 359/34 |
| 6,999,165 B2 | 2/2006 | Hagler | |

(Continued)

OTHER PUBLICATIONS

Yeonjoon Park, et al., "Miniaturization of Fresnel spectrometer", Journal of Opt. A: Pure Appl. Opt. 10, Aug. 27, 2008, pp. 1-8.

*Primary Examiner* — Tarifur Chowdhury
*Assistant Examiner* — Abdullahi Nur
(74) *Attorney, Agent, or Firm* — Thomas K. McBride, Jr.; Robin W. Edwards; Linda B. Blackburn

(57) ABSTRACT

A spectrometer system includes an optical assembly for collimating light, a micro-ring grating assembly having a plurality of coaxially-aligned ring gratings, an aperture device defining an aperture circumscribing a target focal point, and a photon detector. An electro-optical layer of the grating assembly may be electrically connected to an energy supply to change the refractive index of the electro-optical layer. Alternately, the gratings may be electrically connected to the energy supply and energized, e.g., with alternating voltages, to change the refractive index. A data recorder may record the predetermined spectral characteristic. A method of detecting a spectral characteristic of a predetermined wavelength of source light includes generating collimated light using an optical assembly, directing the collimated light onto the micro-ring grating assembly, and selectively energizing the micro-ring grating assembly to diffract the predetermined wavelength onto the target focal point, and detecting the spectral characteristic using a photon detector.

19 Claims, 3 Drawing Sheets

U.S. PATENT DOCUMENTS

| | | |
|---|---|---|
| 7,084,972 B2 | 8/2006 | Treado |
| 7,158,228 B2 | 1/2007 | Psaltis et al. |
| 7,161,673 B2 | 1/2007 | DaSilva |
| 7,196,791 B2 | 3/2007 | Johansen et al. |
| 7,253,897 B2 | 8/2007 | Moon et al. |
| 7,253,958 B2 | 8/2007 | Aizenberg et al. |
| 7,262,917 B2 | 8/2007 | Yang et al. |
| 7,394,890 B1 | 7/2008 | Wang et al. |

\* cited by examiner

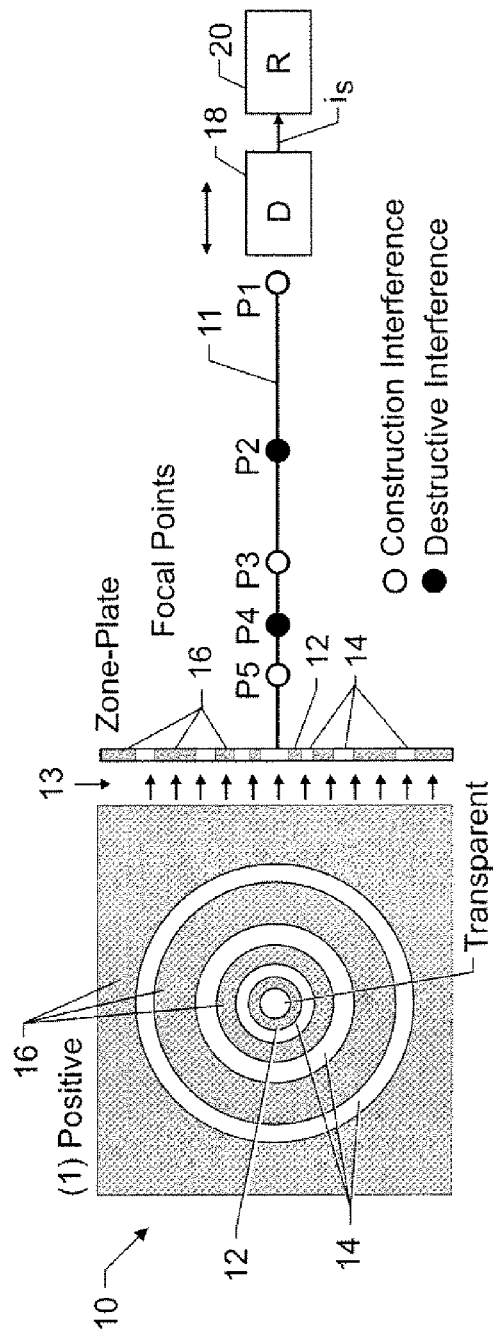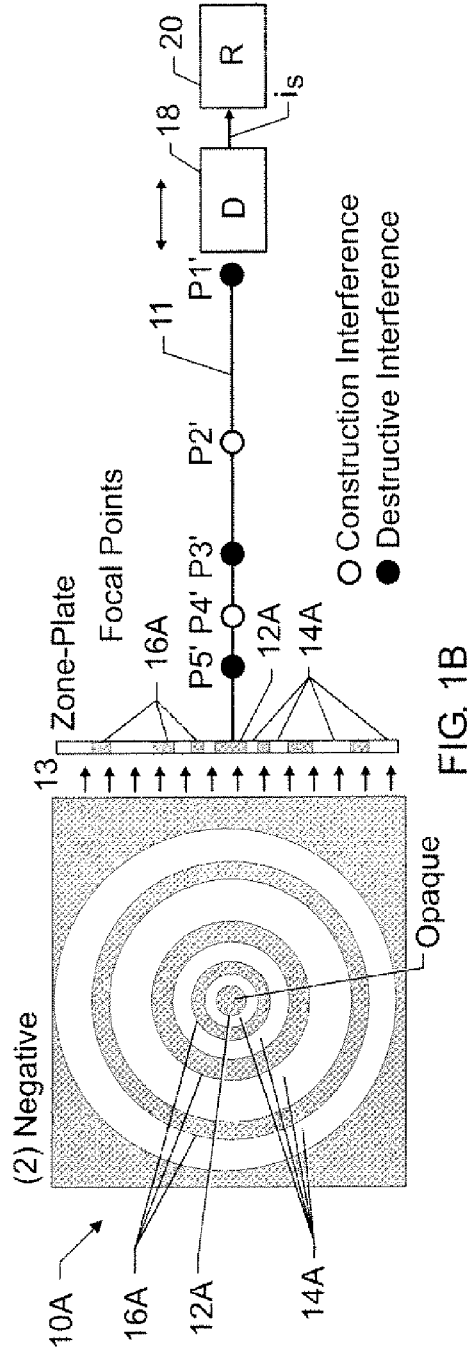
FIG. 1A
FIG. 1B

ND METHOD OF USE

MICRO SPECTROMETER FOR PARALLEL LIGHT AND METHOD OF USE

CROSS-REFERENCE TO RELATED APPLICATIONS

This application claims priority to and the benefit of U.S. Provisional Application 61/089,194 filed on Aug. 15, 2008, which is hereby incorporated by reference in its entirety.

ORIGIN OF THE INVENTION

The invention described herein was made by employees of the United States Government and may be manufactured and used by or for the Government for governmental purposes without payment of any royalties thereon or therefor.

TECHNICAL FIELD

The present invention relates generally to spectrometers, and in particular to a miniaturized spectrometer system having micro-scale ring gratings and an electro-optically-selectable wavelength.

BACKGROUND OF THE INVENTION

Spectroscopy pertains to the study of the dispersion of light into its component wavelengths. By analyzing the absorption and dispersion of incident source light and other radiation by matter, scientists are able to study various properties of the matter such as temperature, mass, luminosity, composition, etc. Optical instruments known as spectrometers are used to measure and study such light dispersion. Spectrometers therefore play an essential role in the study and design of various scientific monitoring devices, for example multi-spectral imaging (MSI) systems, hyper-spectral imaging (HSI) systems, and the like.

In a conventional spectrometer, incident light passes through a first linear opening or slit formed in a mirror or an optical lens. A beam of incident light passing through the first slit illuminates a prism or a linear grating device. The grating device may have a series of vertically-aligned gratings which diffract the incident light into its component colors, with each color corresponding to a particular band of wavelengths of the electromagnetic spectrum.

Spectrometers may include multiple aperture slits, with the first slit positioned in front of the linear grating device to initially select light in a relatively narrow band of wavelengths. The linear grating device spreads this band at different wavelength-dependent angles. A second slit in another mirror or optical lens may be positioned to allow for the selective passage of a narrower band of the light beam from the linear grating device. The second slit may be used to direct selected wavelengths to a measurement device to determine a desired spectral characteristic. In this manner, a specific wavelength or set of wavelengths may be selected for detailed spectral analysis. However, the miniaturization of conventional spectrometers may sacrifice the available optical resolution of such devices, as resolution is largely dependent on the density of the number of gratings and the path length of the incident light.

SUMMARY OF THE INVENTION

Accordingly, a miniature spectrometer system is provided herein that is optimized for spectral data collection from parallel light received from an optical device, e.g., a telescope, an optical fiber waveguide, or microscopic lens optics. The spectrometer uses a micro-ring grating assembly, an optical device for collimating source light, and a photon detector or other suitable spectral sensor. The spectrometer has a sub-millimeter or micro-scale footprint and configuration that may be particularly well suited for use in molecular spectroscopy applications.

A quartz optical waveguide or other suitable waveguide guides collimated light to the micro-ring grating (μRG) assembly. Light guided into the μRG assembly is differentiated by diffraction through the micro-ring pattern of the μRG, and by an electro-optical layer positioned adjacent thereto. The refractive index of the electro-optical layer may be selectively varied by generating and applying a sufficient electric field thereto to select and diffract only predetermined wavelengths of the parallel light onto a sensory plane.

In particular, the spectrometer system includes an optical assembly adapted for collimating light from a light source, a μRG assembly having a plurality of coaxially-aligned micro-ring gratings configured for diffracting a predetermined wavelength of the collimated light onto a target focal point, an aperture device, and a photon detector. The aperture device defines an aperture circumscribing the target focal point, and the photon detector detects intensity or another spectral characteristic of the predetermined wavelength. The μRG assembly may be selectively energized to select the predetermined wavelength(s).

The μRG assembly may include the electro-optical layer noted above, with the electro-optical layer electrically connected to an energy supply and selectively energized thereby to change or "tune" the refractive index of the electro-optical layer as needed. Alternately, the coaxially-aligned ring gratings may be electrically connected to the energy supply and energized, e.g., with alternating or equal/opposite voltages, in order to tune the refractive index in a different manner. A data recorder in communication with the photon detector may be used for recording the intensity or other desired spectral characteristic.

A method of detecting a spectral characteristic of a predetermined wavelength of source light includes generating collimated light using the optical assembly, directing the collimated light onto the μRG assembly, and selectively energizing the μRG assembly using an energy supply to thereby diffract the predetermined wavelength onto the target focal point. The method includes detecting the spectral characteristic using a photon detector or other suitable spectral detection device.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1A is a schematic illustration of a positive micro-zone plate (MZP) having micro-ring gratings usable within a spectrometer system in accordance with the present invention;

FIG. 1B is a schematic illustration of an alternate negative MZP also usable with the spectrometer system of the present invention;

DESCRIPTION OF THE PREFERRED EMBODIMENTS

Figure 2:
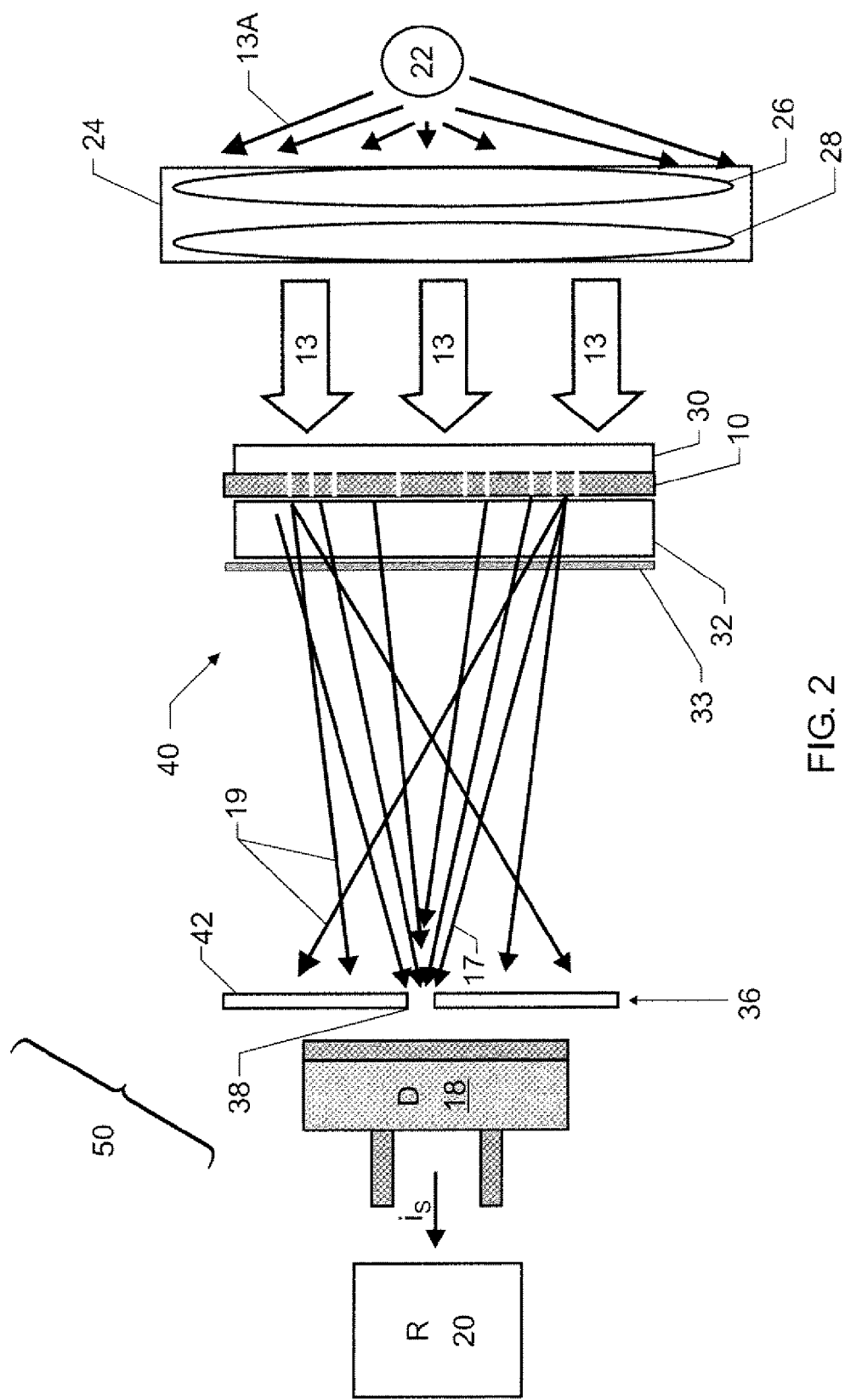
FIG. 2 is schematic illustration of the micro-ring spectrometer system of the present invention.

Referring to the drawings wherein like reference numbers represent like components throughout the several figures, and beginning with FIG. 1A, a positive micro-zone plate (MZP) 10 is provided that can be used within a parallel light micro spectrometer system 50 of the present invention, as shown in FIG. 2 and discussed in detail hereinbelow. The structure of the MZP 10 may be fabricated as a series of concentric micro-ring gratings on a thin-film of glass or other suitable material. As will be understood by those of ordinary skill in the optical arts, the term "grating" refers to an optical element configured for diffracting incident light in a particular manner. Gratings have a regular pattern which splits and diffracts incident light into several beams of light each travelling in directions that depend upon the spacing or gap between adjacent gratings and the wavelength(s) of the incident light.

The MZP 10 shown in FIG. 1 includes a transparent center 12 that is circumscribed by a series of transparent rings 14. The transparent rings 14 are separated by an interposed series of opaque rings 16, with the transparent center 12 and each of the rings 14, 16 being coaxially-aligned and centered on an optical axis 11. For clarity of illustration, the number of rings 14, 16 is kept at a minimum in FIGS. 1A and 1B, with the actual number of rings used in the construction of the MZP 10 being dependent upon the particular design and intended use of the MZP 10.

Source light (arrows 13) is directed toward the micro-ring gratings of the MZP 10 from a light source 22 (see FIG. 2), e.g., a naturally-existing light emitter, fluorescence, or emission spectra from excited molecules of target materials by an accompanying light-emitting diode (LED) or a diode laser. The source light (arrows 13) is then diffracted by the various rings 14, 16 of the MZP 10 into different wavelengths, with each wavelength directed toward a particular focal point P1, P2, P3, P4, or P5. That is, the particular focal point corresponds to particular wavelengths or frequencies of the source light (arrows 13). The transparent center 12 allows a constructive interference point at the farthest focal point, i.e., focal point P1. Additional constructive interference points are provided at focal points P3 and P5.

As is well understood in the art, wave propagation of light gives rise to the principals of constructive and destructive wave interference. The shape of the medium is determined during interference by the sum of the separate amplitudes of each wave as one wave passes through another. When the crest of one wave is superpositioned upon the crest of another, the waves constructively interfere. Constructive interference also occurs when the trough of one wave is superpositioned upon the trough of another. Conversely, destructive interference occurs when the crest of one wave is superpositioned upon the trough of another. During destructive interference, the positive amplitudes from one crest are added to the negative amplitudes from the other trough, with the result being a reduced amplitude or destructive wave interference. Such principles give rise to the different constructive/destructive focal points discussed above.

Referring to FIG. 1B, another type of MZP is the negative MZP 10A, which has an opaque center 12A at its optical center that is circumscribed by a series of opaque rings 16A. The opaque rings 16A are separated by a corresponding series of transparent rings 14A, with the opaque center 12A and each of the rings 14A, 16A being coaxially-aligned and centered on optical axis 11. The gratings of MZP 10A provide a destructive interference point at P1'. The source light (arrows 13) is diffracted by the various gratings of the MZP 10A, and is thereafter directed through an aperture 38 (see FIG. 2) toward a focal point P1', P2', P3', P4', and P5', with the particular focal point corresponding to a band of wavelengths of the source light (arrows 13). The opaque center 12A allows a constructive interference point at the farthest focal point, i.e., focal point P1'. The focused photons are 180 degree out of phase with respect to the photons in FIG. 1A. Additional destructive interference points are provided at focal points P2' and P4'.

Figure 3A:
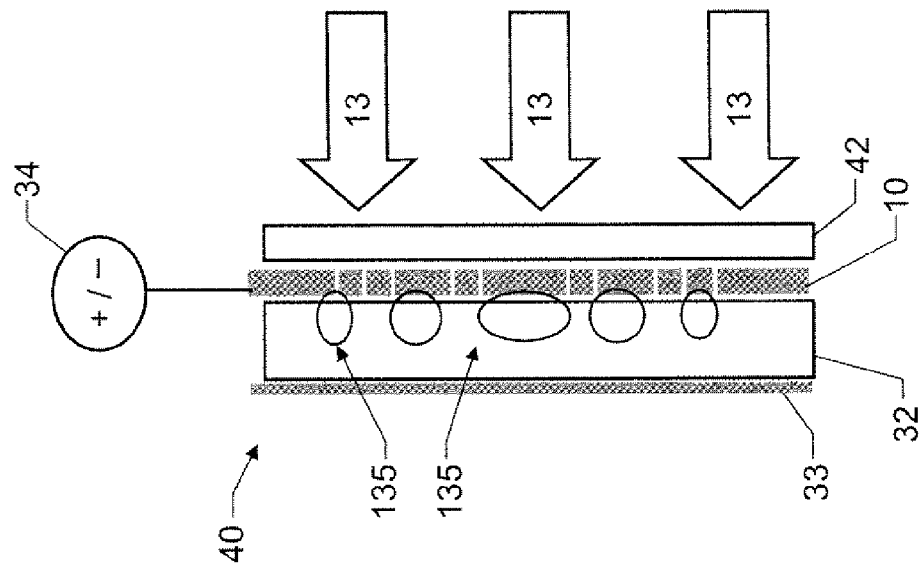
FIG. 3A is a schematic illustration of a micro-ring grating assembly portion of the micro-ring spectrometer system of FIG. 2.
Figure 3B:
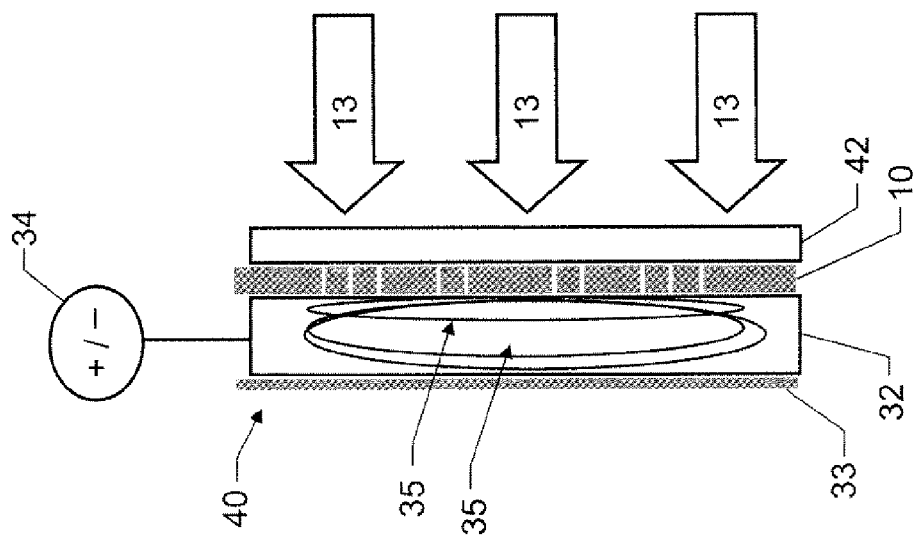
FIG. 3B is a schematic illustration of the micro-ring grating assembly of FIG. 3A according to another embodiment.

As noted above, the MZP 10, 10A may include micro-ring gratings that focus parallel photons of the source light (arrows 13) as shown in FIGS. 2, 3A, and 3B into the different radial points according to their wavelengths. A photon detector (D) 18 may be placed at any of the focal points P1-P5 or P1'-P5', and may relay or transmit detected spectral information (arrow $i_s$) to a data recorder (R) 20 to provide a historical record facilitating spectral analysis.

Zero-order direct photons from the source light (arrows 13) through the transparent center disk 12 of FIG. 1A may cause bright irregular spots at the concentric center of any image produced using a Secondary Electron Microscope (SEM). It takes an infinite number of micro-ring gratings to completely compensate for $0^{th}$ order constant photons through the transparent center 12 of the positive MZP 10 shown in FIG. 1A. This result is similar to the Fourier transform in which y=c (a constant) is approximated by the sum of infinite sine and cosine waves. However, a negative grating such as the MZP 10A of FIG. 1B does not have a direct line-of-sight between the focal point and the light source, and therefore all converging light is from higher order photons without a $0^{th}$ order photon. Therefore, the MZP 10A of FIG. 1B may be particularly well suited for use as a micro-ring grating due to the opacity of its opaque center 12A.

Referring to FIG. 2, the parallel light micro spectrometer system 50 of the present invention includes an optical assembly 24, a micro-ring grating (µRG) assembly 40, a light-blocking aperture device 36, and the photon detector (D) 18. The aperture device 36 defines an aperture 38, which may be circular in shape according to one embodiment, and which circumscribes a focal point P, i.e., one of the focal points P1-P5 of FIG. 1A or P1'-P5' of FIG. 1B as described above. The spectrometer system 50 may be placed in communication with data recorder 20, which may be any device configured for recording the desired spectral information (arrow $i_s$) detected, measured, or otherwise determined by the photon detector 18.

Light source 22 may be a naturally-existing light emitter, fluorescence, or emission spectra from excited molecules of target materials by an accompanying light-emitting diode (LED) or diode laser. The light source 22 generates raw source light (arrows 13A), which is transmitted to the optical assembly 24. The optical assembly 24 includes front-end optics 26, e.g., a series of collimating lenses or another suitable collimating device, and an optical waveguide 28, e.g., a quartz element or other suitable waveguide. The optics 26 collimate the raw source light (arrows 13A) into parallel photons of source light (arrows 13), and the waveguide 28 directs the collimated source light (arrows 13) to the various micro-ring gratings of the MZP 10.

Another possibility for distinguishing and identifying the target material is to use a sensing medium, e.g., nanocrystals or quantum dots undergoing quantum-confined discrete transition by excitation. The level of transition of quantum-dots is heavily influenced by the contact of surrounding materials. The light-emission pattern from quantum dots after contact with an unknown material is different from the emission pattern of uncontacted cases. The difference in emission spectra is the indication of foreign materials adhering to the quantum dots.

The source light (arrows 13) is guided to the micro-ring gratings of the MZP 10 through a transparent substrate 30. The light is then differentiated by diffraction through the micro-ring pattern of the gratings of MZP 10 and an electro-optical (E/O) medium or layer 32 positioned adjacent thereto, and/or at least partially between rings of the MZP 10, with diffracted light (arrows 17) passing from the micro-ring gratings of the MZP 10 through a transparent electrode layer 33, and to the aperture device 36.

Diffracted light (arrows 17) of a predetermined wavelength(s) is allowed to enter the aperture 38, while the non-selected wavelength(s)(arrows 19) is reflected away by a light-blocking surface 42 of the aperture device 36. The electrode layer 33 may be constructed of Indium Tin Oxide (ITO) or another suitable material providing a bias voltage for the E/O layer 32. The E/O layer 32 in turn may be constructed of a material having a refractive index that is varied by application of an electrical field, e.g., liquid crystal, non-linear optical crystal, or electro-optical polymer to name just a few.

Referring to FIGS. 3A and 3B, an energy source 34 may be selectively connected to the μRG assembly 40 to select and diffract only certain wavelengths of light. In the configuration shown in FIG. 3A, the energy source 34 may be electrically-connected to the E/O layer 32. The E/O layer 32 may be selectively energized to vary its refractive index, as represented in FIG. 3A by the various refractive zones 35. Calibrated wavelengths of light may be selected and diffracted onto a sensory plane, i.e., a plane containing the photon detector 18, by changing the level of the voltage supplied by the energy supply 34.

Particularly, when the optical assembly 24 blocks zero-order direct light, the concentric micro-rings of the MZP 10 provide a better grating effect without background noise. Because the phase of the propagating light is changed by the refractive index of the E/O layer 32, selected photons of a specific wavelength may be focused on an aperture 38 formed in or defined by the aperture device 36. The aperture 38 directs light of a selected wavelength of diffracted light (arrows 17) to the photon detector 18, e.g., a photo-diode or other suitable device, while as noted above with reference to FIG. 2 photons having different or non-selected wavelengths are absorbed or scattered by the light-blocking surface 42 of the aperture device 36.

Referring to FIG. 3B, in an alternate embodiment the energy source 34 may be used to apply different voltages to the micro-ring gratings of the MZP 10 to create different refractive zones 135 in the E/O layer 32. For example, alternating voltages may be applied such that a strong electric field is confined between adjacent rings, e.g., one ring of the MZP 10 may be energized at a level of 5V, while the adjacent ring is energized at −5V, and so on. Different voltages on the ring gratings of the MZP 10 select the wavelengths of the photons that will be focused on aperture 38 (see FIG. 2).

While the best modes for carrying out the invention have been described in detail, those familiar with the art to which this invention relates will recognize various alternative designs and embodiments for practicing the invention within the scope of the appended claims.

The invention claimed is:

1. A miniature spectrometer system comprising:
   an optical assembly adapted for generating collimated light;
   a micro-ring grating (μRG) assembly having an opaque center and a plurality of coaxially-aligned ring gratings, the μRG assembly being configured for diffracting a plurality of predetermined wavelengths of the collimated light onto a plurality of target focal points;
   an aperture device defining an aperture circumscribing the target focal points; and
   a photon detector configured for detecting spectral characteristics of the predetermined wavelengths;
   wherein the μRG assembly is selectively energizable to thereby select the predetermined wavelengths, and wherein said spectrometer has a sub-millimeter or micro-scale footprint.

2. The spectrometer system of claim 1, further comprising an energy supply electrically connected to the μRG assembly and adapted for selectively energizing the μRG assembly to select the predetermined wavelengths.

3. The spectrometer system of claim 1, wherein the μRG assembly includes an electro-optical layer having a variable refractive index, and wherein the electro-optical layer is selectively energized to generate an electrical field that changes the refractive index.

4. The spectrometer system of claim 3, wherein the plurality of coaxially-aligned ring gratings are electrically energized to generate the electrical field.

5. The spectrometer system of claim 4, wherein adjacent rings of the plurality of coaxially-aligned ring gratings are energized with alternating voltages.

6. The spectrometer system of claim 1, further comprising a data recorder in communication with the photon detector and configured for recording the spectral characteristics.

7. The spectrometer system of claim 1, wherein the optical assembly includes a set of collimating lenses operable for collimating the raw source light into the collimated light, and an optical waveguide configured for directing the collimated light to the μRG assembly.

8. A miniature spectrometer system comprising:
   an optical assembly adapted for generating collimated light from a non-collimated source light;
   a micro-ring grating (μRG) assembly that is electrically connectable to an energy supply, and having:
      an electro-optical layer with a variable refractive index that is varied in the presence of an applied electrical field;
      an opaque center; and
      a plurality of coaxially-aligned ring gratings positioned adjacent to the electro-optical layer, wherein the ring gratings are configured for diffracting a plurality of predetermined wavelengths of the collimated light onto a plurality of target focal points;
   an aperture device defining a circular aperture circumscribing the target focal points; and
   a photon detector operable for detecting an intensity of the selected wavelengths;
   wherein at least one of the electro-optical layer and the ring gratings are selectively energizable using the energy supply to thereby generate the applied electric field, and wherein said spectrometer has a sub-millimeter or micro-scale footprint.

9. The spectrometer system of claim 8, wherein the μRG assembly includes a transparent substrate positioned adjacently to the plurality of coaxially-aligned ring gratings.

10. The spectrometer system of claim 8, wherein the μRG assembly includes a transparent electrode layer positioned adjacently to the electro-optical layer and configured for providing a bias voltage for the electro-optical layer.

11. The spectrometer system of claim 10, wherein the transparent electrode layer is constructed at least partially of Indium Tin Oxide (ITO).

12. The spectrometer system of claim 8, wherein the electro-optical layer is constructed at least partially of at least one of: liquid crystal, non-linear optical crystal, and an electro-optical polymer material.

13. The spectrometer system of claim 8, wherein the photon detector is configured as a photo-diode.

14. The spectrometer system of claim 8, wherein the electro-optical layer is positioned at least partially between adjacent rings of the μRG assembly, and wherein the adjacent rings are selectively energizable to provide alternating voltages on the adjacent rings for varying the variable refractive index.

15. A method of detecting a spectral characteristics of a predetermined wavelength of source light using a miniature spectrometer having a sub-millimeter or micro-scale footprint, the method comprising:

generating collimated light using an optical assembly;

directing the collimated light onto a micro-ring grating (μRG) assembly having an opaque center and a plurality of coaxially-aligned ring gratings configured for diffracting a plurality of predetermined wavelengths of the collimated light wavelength onto a plurality of target focal points;

selectively energizing the μRG assembly using an energy supply to thereby diffract the predetermined wavelengths onto the target focal points; and detecting spectral characteristics using a photon detector.

16. The method of claim 15, wherein generating collimated light using an optical assembly includes collimating raw source light using a plurality of collimating lenses, and wherein directing the collimated light onto a μRG assembly includes directing the collimated light using an optical waveguide.

17. The method of claim 15, further comprising:

recording spectral characteristics using a data recorder.

18. The method of claim 15, wherein selectively energizing the μRG assembly includes applying a voltage to an electro-optical layer of the μRG assembly.

19. The method of claim 15, wherein selectively energizing the μRG assembly includes applying alternating voltages to adjacent rings of the μRG assembly to create different refractive zones in the electro-optical layer.

* * * * *